(No Model.)
J. CAMPEN.
Soldering Tool.
No. 232,936. Patented Oct. 5, 1880.
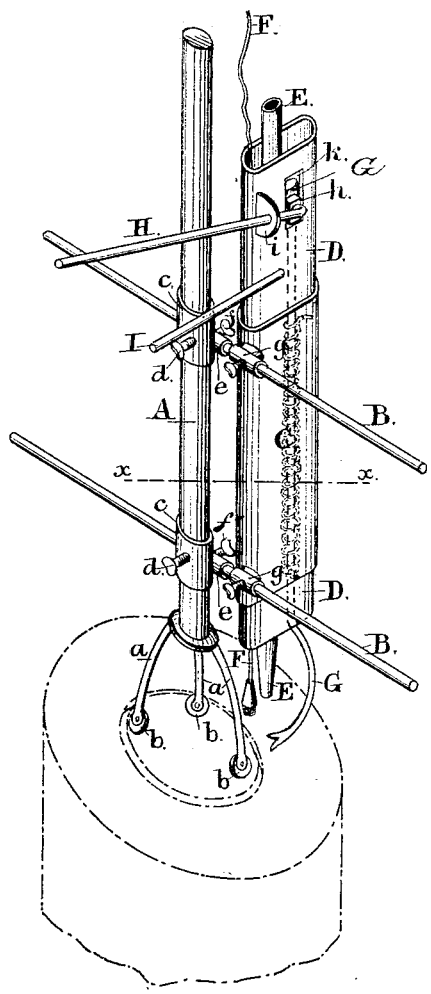
FIG. I.
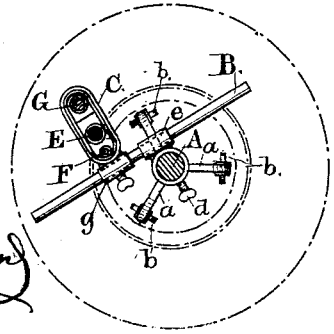
FIG. II.
WITNESSES. INVENTOR.
John Campen

UNITED STATES PATENT OFFICE.

JOHN CAMPEN, OF BALTIMORE, MARYLAND.

SOLDERING-TOOL.

SPECIFICATION forming part of Letters Patent No. 232,936, dated October 5, 1880.

Application filed April 29, 1880. (No model.)

*To all whom it may concern:*

Be it known that I, JOHN CAMPEN, a citizen of the United States, residing at Baltimore city, in the county of Baltimore and State of Maryland, have invented certain new and useful Improvements in Soldering-Tools; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in soldering-tools, more especially adapted for soldering the caps on cans for oysters, vegetables, &c.; and the objects of my improvements are more especially, first, to provide a support or holder for a blow-pipe for a combined compressed-air and electric flame, as shown in an application for soldering-machine allowed me on March 12, 1880, although it may be used with other soldering-tools; second, to facilitate the soldering of the cap on the can; and, third, to support the entire device with less friction than when a central supporting-iron is used. I attain these objects by the mechanism illustrated in the accompanying drawings, in which—

Figure 1 is a perspective view of my soldering-tool in position on a can. Fig. 2 is a horizontal section on line $x\ x$ of Fig. 1.

In the drawings, A represents a rod, supported at its lower end on three legs or supports, $a$, each of which is provided at its lower extremity with a friction-roller, $b$. Upon the rod A are placed two short pieces of tube, $c$, adjusted and held in place on the rod by set-screws $d$. To each tube-piece $c$ is secured, at right angles and in horizontal position, another short piece of tube, $e$, in which the horizontal bars or rods B B can be moved lengthwise from one machine to another, and may be secured by set-screws $f$.

A flat or round tube, C, in which the jacket D of my combined blow-pipe and solder-holder can be moved up and down, is supported on the bars B by tube-pieces $g$, and can thus be moved from one machine to the other.

The blow-pipe consists of a jacket, D, in which the tube E, for compressed air, leading to a suitable reservoir, and the electric wire F, connected to an electric battery or other supply, are secured.

The holder G for the solder is arranged to slide up and down by means of a lever, H, attached thereto by a lug, $h$, which projects through a slot, $k$, in the jacket D and moves up and down therein. The lever H is supported in a lug or bracket, $i$, secured to the jacket D, and acts as the fulcrum to the lever H for raising and lowering the solder-holder, which is provided with a spring (shown in dotted lines) to force it downward. Another lever, I, secured to the jacket D, serves to shift the blow-pipe and holder from one machine to the other.

The operation is as follows: The can is placed on a chuck and revolved by any suitable mechanism, and the cap is placed in position on the can. The support A, with its legs and friction-rollers, is then placed on the cap and adjusted with the friction-rollers bearing against said cap. The combined blow-pipe and holder is then adjusted as desired, vertically as well as horizontally, and the solder is placed on the cap and held by the curved solder-holder in position, and is by it prevented from revolving with the can. In a few moments the solder will be melted by the blow-pipe and the cap secured in place, and the can may be removed and replaced by another.

The great advantages of my mechanism are that the friction occasioned by the ordinary centering-bar placed against the cap is reduced by the friction-rollers on the legs of the support. The caps are held in place much better by the three legs than when one is employed, in which case they often slip off. The soldering can be done much more economically and quickly than in the ordinary way. The parts are not liable to get out of order, and can be easily adjusted vertically and horizontally, as desired.

Having thus described my invention, what I claim, and desire to secure by Letters Patent, is—

1. In a soldering apparatus, the support A, having three legs, *a*, provided with friction-rollers *b*, when constructed substantially as shown, and for the purpose herein specified.

2. In a soldering apparatus, the support A, having legs *a*, provided with friction-rollers *b*, and adjustable tube-pieces *c* and *e* and set-screws, all constructed and arranged as shown, and for the purpose specified.

3. In a soldering apparatus, the combination of support A, having three legs, *a*, provided with friction-rollers *b*, with the combined blow-pipe for compressed air, and an electric heat and solder holder, constructed and arranged for operation substantially as specified.

4. The soldering-tool herein described, consisting of the support A, having three legs, *a*, provided with friction-rollers *b*, the jacket C, combined blow-pipe for compressed air and electric flame, the solder-holder, and the bars B B, all constructed and arranged for operation substantially as shown, and for the purpose specified.

In testimony whereof I affix my signature in presence of two witnesses.

JOHN CAMPEN.

Witnesses:
W. S. WILKINSON,
J. H. CRAIG.